Patented Apr. 10, 1945

2,373,547

UNITED STATES PATENT OFFICE 2,373,547

METHOD OF REMOVING CATIONS FROM LIQUID MEDIA

Gaetano F. D'Alelio, Pittsfield, Mass., assignor to General Electric Company, a corporation of New York No Drawing. Application October 15, 1942, Serial No. 462,207

6 Claims. (Cl. 210—24)

The present invention relates to the production of new resins and to their use for removing cations from liquid media, such as aqueous media. More particularly, this invention is concerned with the removal of cations from solutions by contacting the liquid media with a novel mass comprising a substantially insoluble phenolic resin modified to have a high cation capacity.

Many natural and synthetic compositions have been proposed for removing cations from solutions. Such materials to be useful must possess the following properties:

1. They must contain either a chemical group which will react with the cation or have an activated surface which physically adsorbs the cation.
2. They must be capable of regeneration to at least part of their original activity so that they may be reused.
3. They must be insoluble in the liquid media before and after removing cations from the media. Thus, if an acid were used as the treating agent it would have to be insoluble both as the acid and as the salt since the acid is the form before adsorbing cations and the salt is the form after adsorbing cations.

It is known that resins prepared from polyhydric phenols and aldehydes exhibit cation exchange properties. However, the cation exchange capacities of the most common phenolic resins, i. e. those prepared from a monohydric phenol and an aldehyde, have, in general, been too low to warrant their use in industry.

I have now discovered that by suitable modification of phenol-aldehyde resins, i. e. resins prepared from a monohydric phenol and an aldehyde, resinous ion-exchange bodies may be prepared which exhibit pronounced ion exchange properties. More specifically, I have discovered that cations may be removed from liquid media by contacting such media with phenol-aldehyde resins containing co-condensed (inter-condensed) aliphatic and substituted-aliphatic amino-carboxylic acids.

Any suitable method may be used in preparing the insoluble infusible resins produced in my invention. For example, the aliphatic amino-carboxylic acids may be reacted with pre-condensed liquid phenol-aldehyde resins and the resulting mass cured to a hard infusible resin or, alternatively, a phenol, an aldehyde and an amino-carboxylic acid may be mixed, heat-reacted, and cured to a hard, infusible state. The reactions may be carried out in the presence or absence of the solvents or a dispersion medium for the components at atmospheric, subatmospheric, or superatmospheric pressure. The reaction may be effected under acid, alkaline, or neutral conditions. Examples of phenols which may be used in the preparation of phenol-aldehyde-aminocarboxylic acid resins are the trifunctional phenols having three aldehyde-reactable positions, including phenol, meta substituted phenols such as meta-cresol, meta-ethyl phenol, meta-nitrophenol, meta-chlorophenol, etc., or meta-disubstituted xylenols such as the 3,5-dimethyl phenol, 3-methyl-5-ethyl phenol, 3-chloro-5-nitro-phenol. Difunctional phenols having two aldehyde-reactable positions such as o- and p-cresol, o-chlorophenol, may be used with sufficient trifunctional phenol to cause the resin to cure completely, or may be used with aldehydes, such as acrolein, glyoxal, etc. which will form resins which are heat-curable after the initial condensation.

Various aldehydes, such as formaldehyde, acetaldehyde, propionaldehyde, butyraldehyde, acrolein, crotonaldehyde, benzaldehyde, naphthaldehyde, glyoxal, as well as halogen substituted aldehydes such as chloroacetaldehyde, etc. or compounds engendering aldehydes, e. g., paraform, hexamethylenetetramine, paraldehyde, etc. may be used. The majority of these aldehydes may be used alone or preferably in conjunction with formaldehyde. Formaldehyde is the preferred aldehyde.

The aliphatic and substituted-aliphatic aminocarboxylic acids which may be used include the crude amino acids obtained by protein hydrolysis. Typical aliphatic amino-carboxylic acids are glycine, alanine, glutamic acid, aspartic acid, arginine, histidine, hydroxyproline, leucine, proline, tyrosine, tryptophane, etc. Due to greater commercial availability, glycine is the preferred amino-carboxylic acid.

Resinous reaction products of a phenol, an aldehyde, and catalytic proportions of an amino-carboxylic acid and a salt of said acid are described in my Patent 2,247,772, issued July 1, 1941. The present resins which have been found to be useful as cation-exchange bodies are fundamentally different from the patented resins in that they contain greater than catalytic amounts of the amino-carboxylic acid reactant, and possess a greater cation-exchange activity. The resins of the present invention, therefore, are not to be considered the equivalent of the resins disclosed and claimed in the above-identified patent.

After condensation of the reaction components is complete, the product is isolated, if a solvent or dispersion medium was used, and is thereafter heat-hardened and the heat-hardened product ground to a granular form. All factors being equal, the finer the granular form or the more surface is exposed the more effective the resin is in removing the cations from the solution.

When the liquid media having various cation impurities dissolved therein are brought in contact with these insoluble, infusible resins containing carboxyl groups, the cations, e. g., sodium ions, calcium ions, lead ions, magnesium ions, iron ions, etc., react with the carboxyl groups to form salts which are also insoluble and infusible. The cations are, therefore, effectively removed from solution.

After the resin has adsorbed the cations it can readily be regenerated, for example by washing with a dilute acid, preferably a mineral acid which forms soluble salts with the adsorbed cations.

In order that those skilled in the art better may understand how the present invention is carried into effect, the following illustrative examples are given, all parts being by weight:

*Example 1*

| No. | Composition | | Efficiency |
| --- | --- | --- | --- |
| | Liquid resin | Amino acid and amount | |
| | | | Per cent |
| A | 60 | Glycine, 9.0 | 13 |
| B | 60 | Glycine, 12.0 | 14 |
| C | 60 | Glycine, 19.2 | 13 |
| D | 60 | Glutamic, 26.0 | 9 |

The liquid resin used in the above preparations was a liquid phenol-aldehyde varnish containing 80 per cent resin solids. It was prepared by refluxing 1 mol phenol and 2 mols formaldehyde with 0.75 per cent KOH based on the weight of the phenol for between 2 and 2½ hours and thereafter dehydrating the reaction products under reduced pressure to the desired solids content. This liquid resin and the designated amino-carboxylic acids were well mixed in the indicated proportions, reacted under heat for from 15 to 30 minutes and thereafter cured to an infusible state by heating for 16 hours at 120–130° C. The hardened resins were then ground to pass a 20-mesh screen and tested for their ability to remove cations from solution by allowing a weighed sample of each resin to remain in contact with a standard sodium hydroxide solution for 5 minutes, filtering and titrating the filtrate with standard acid to determine how much the alkalinity of the water had been decreased by the adsorption of the sodium ions. The efficiency was measured by calculating the ratio of sodium ions actually removed to the sodium ions theoretically removable if each of the carboxyl groups present in the resin had removed a sodium ion. The efficiencies of these resins are given in the last column of the above table. The resins are stable and maintain their exchange capacities throughout a number of adsorption and regeneration cycles. In certain instances, an actual increase of the exchange capacity of the resin is noted after regeneration. For example, resin C, after regeneration with a solution of hydrochloric acid had an exchange capacity equal to 112 per cent of its capacity prior to regeneration. In general, the resins are substantially insoluble in caustic solutions and in hot water.

If desired, the amino-carboxylic acids may be added to the liquid resin prior to the dehydration so that the amino-carboxylic acid is intercondensed simultaneously with the dehydration. The other operations are carried out as described above.

*Example 2*

This example illustrates an alternative procedure for the preparation of cation-exchange resins. A mixture of 47 parts by weight of phenol, 80 parts of a 37 per cent aqueous solution of formaldehyde, and 20 parts of glycine was allowed to stand over night. The mixture was then heated at 100° C. for 15 to 30 minutes and thereafter cured at 120 to 130° C. for 24 hours. The resin had an efficiency of 15 per cent as determined by the procedure set forth under Example 1.

For best results, it is desirable that the resins contain a substantial amount of the amino-carboxylic acids. Preferably the reactants are so proportioned that there is present in the reaction mixture greater than one-fourth but less than three-fourths mol amino-acid for each mol phenol. Sufficient aldehyde should be used to obtain a heat-hardenable resin, that is, at least 1.1 mols aldehyde for each mol phenol and for each mol of amino-carboxylic acid. Preferably I use about 1.5 mols of aldehyde for each mol of phenol and for each mol of amino-carboxylic acid.

The ion exchange resins prepared in accordance with my invention may be used in all manners known at present involving ion exchange reactions. The resins are particularly useful in the purification of water. The resins in granular form may be used as such or, if desired, an inert material such as diatomaceous earth (e. g., fuller's earth, including spent fuller's earth from petroleum refining processes), alundum, coke, silica, cinders, porous glass, etc. may be used as a carrier for the resins to increase the effective surface of the latter. This may be done by adding such carriers to the resin or a solution thereof at any time prior to the complete condensation of the resin to the infusible, insoluble state, followed by complete curing of the resin. In this way the carrier is surface-coated with the resin. Alternatively, an emulsion or dispersion of the resin may be used for coating the carrier materials, thus eliminating the necessity of grinding the resin before use since the product will be obtained in a finely divided state.

What I claim as new and desire to secure by Letters Patent of the United States is:

1. The method of treating liquid media to remove cations therefrom which comprises contacting such media with a mass comprising an infusible resinous cation-exchange body which is the reaction product of a phenol, and aldehyde, and an aliphatic amino-carboxylic acid, said amino-carboxylic acid being present in the ratio of more than 0.25 mol but not more than 0.75 mol per mol of phenol.

2. The method of treating aqueous media to remove cations therefrom which comprises percolating such media through the dehydrated, infusible resinous cation-exchange body which is the reaction product of a liquid phenol-aldehyde condensation product intercondensed with an aliphatic amino-carboxylic acid, said amino-carboxylic acid being present in the ratio of more than 0.25 mol but not more than 0.75 mol per mol of phenol.

3. The method of treating liquid media to remove cations therefrom which comprises percolating such media through a mass comprising an infusible resinous cation-exchange body which is the reaction product of phenol, formaldehyde, and an aliphatic amino-carboxylic acid, said amino-carboxylic acid being present in the ratio of more than 0.25 mol but not more than 0.75 mol per mol of phenol.

4. The method of treating aqueous media to remove cations therefrom which comprises percolating such media through a mass comprising an infusible cation-exchange body which is the resinous reaction product of phenol, formaldehyde, and an aliphatic amino-carboxylic acid, said amino-carboxylic acid being present in the ratio of more than 0.25 mol but not more than 0.75 mol per mol of phenol, the resinous reaction product being deposited as a surface coating on an inert carrier.

5. The method as in claim 3 wherein the amino-carboxylic acid is glycine.

6. The method as in claim 3 wherein the amino-carboxylic acid is glutamic acid.

GAETANO F. D'ALELIO